US012669249B2

(12) United States Patent
Vath et al.

(10) Patent No.: US 12,669,249 B2
(45) Date of Patent: *Jun. 30, 2026

(54) SYSTEMS AND CONTROLLERS FOR CONTROLLING HEATING UNIT TEMPERATURE WITH A SIMULATED OUTDOOR TEMPERATURE, AND METHODS USING THE SAME

(71) Applicant: WATTS REGULATOR CO., North Andover, MA (US)

(72) Inventors: Jay Vath, Coldstream (CA); Michael Breault, Ontario (CA)

(73) Assignee: WATTS REGULATOR CO., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,864

(22) Filed: May 22, 2024

(65) Prior Publication Data

US 2024/0310058 A1     Sep. 19, 2024

Related U.S. Application Data

(63) Continuation of application No. 17/374,931, filed on Jul. 13, 2021, now Pat. No. 12,130,023.

(51) Int. Cl.
| | |
|---|---|
| *F24D 19/10* | (2006.01) |
| *G05B 17/02* | (2006.01) |
| *G05D 23/19* | (2006.01) |
| *G05D 23/24* | (2006.01) |

(52) U.S. Cl.
CPC ......... *F24D 19/1009* (2013.01); *G05B 17/02* (2013.01); *G05D 23/1917* (2013.01); *G05D 23/24* (2013.01)

(58) Field of Classification Search
USPC ........................................................ 700/278
See application file for complete search history.

(56) References Cited

U.S. PATENT DOCUMENTS

| | | | | | |
|---|---|---|---|---|---|
| 4,228,511 | A | * | 10/1980 | Simcoe .............. | G05D 23/1905 236/47 |
| 2018/0039292 | A1 | * | 2/2018 | van Berkel ........... | F24H 15/148 |

OTHER PUBLICATIONS

Crown Boiler, OC Panel Outdoor Air Reset Kit, p/n 233203 (Oct. 2013), available on the internet at least as of 2019 (see google search result screenshot appended to the end of the document) (Year: 2013).*

(Continued)

*Primary Examiner* — Mohammad Ali
*Assistant Examiner* — Joshua T Sanders
(74) *Attorney, Agent, or Firm* — Grossman, Tucker, Perreault & Pfleger, PLLC

(57) ABSTRACT

Systems and methods for controlling a heating Technologies for controlling a heating unit are disclosed. In embodiments, the systems and methods determine a heating unit target temperature based at least in part on a duty cycle of at least one thermostat. The systems and methods may then determine a simulated outdoor temperature corresponding to the heating unit target temperature, and a resistance value corresponding to the simulated outdoor temperature. The systems and methods may then cause a resistance signal including or indicative of the resistance value to be provided to an outdoor temperature input for the heating unit, e.g., to cause the heating unit to modulate to the heating unit target temperature.

18 Claims, 6 Drawing Sheets

400

(56)          References Cited

OTHER PUBLICATIONS

DRN 3.1, PWM/Analog/Floating Point to Resistance Output, May
15, 2018 (originally submitted by applicant in the parent U.S. Appl.
No. 17/374,931) (Year: 2018).*

\* cited by examiner

100

200

300

400

500

SYSTEMS AND CONTROLLERS FOR CONTROLLING HEATING UNIT TEMPERATURE WITH A SIMULATED OUTDOOR TEMPERATURE, AND METHODS USING THE SAME

CROSS REFERENCE TO RELATED APPLICATIONS

This application is a Continuation of U.S. patent application Ser. No. 17/374,931 filed 13 Jul. 2021, which is incorporated herein by reference in its entirety.

TECHNICAL FIELD

The present disclosure relates to systems and controllers for controlling heating unit temperature with a simulated outdoor temperature, and methods using the same. In particular, the present disclosure relates to systems, controllers, and methods for controlling the temperature of a heating unit with outdoor reset capability using a simulated outdoor temperature.

BACKGROUND

Traditional heating systems for residential and commercial heating systems generally include a central heating unit such as a boiler that is connected to network of vents or pipes that are distributed throughout a building. To control the central heating unit, a thermostat is provided in an area to be heated within the building (a "zone") and has a setpoint that can be adjusted to call for a higher or lower temperature in the zone. For example, simple hydronic multi-zone heating systems use non-communicating thermostats that simply turn on a boiler and associated circulating pumps when any one of the thermostats calls for heat. The boiler in such systems is set to operate at a fixed operating temperature that is set based on outdoor temperatures that are expected during the coldest days of the year. Such a system is relatively inefficient because it causes the boiler to operate at a boiler operating temperature that is much higher than is needed for heating for many days of the year.

Over the years interest has grown in making heating units such as boilers and other home heating systems more efficient without sacrificing user comfort. One improvement that has been developed is the so called "room response" technology developed by WATTS Regulator Co. In general, "room response" technology is configured to operate a boiler at the lowest possible boiler operating temperature that is needed to heat the coolest zone to the thermostat setpoint temperature for that zone. FIG. 1 is a block diagram of one example of a heating system that employs room response technology. As shown, heating system 100 includes a boiler 101, a thermostat 103, and a controller 105 that is communicatively coupled to boiler 101 and thermostat 103. The controller 105 includes a processor 107, memory 109, and communications circuitry 115, which may be communicatively coupled to one another via a bus (not shown). System 100 further includes a room response module 111 (RRM), which in this case is in the form of computer readable instructions is stored in memory 109. RRM 111 is generally configured to cause controller to execute room response operations to control the boiler operating temperature of boiler 101. More specifically, in operation RRM 111 causes controller 105 to monitor the duty cycle of thermostat 103, and to produce a control signal that is configured to adjust the operating temperature of boiler 101.

In general, the duty cycle of thermostat 103 is a percentage or other value that is indicative of the amount of time that thermostat 103 calls for heat over a measurement period. Thus, when thermostat 103 infrequently calls for heat over the measurement period the duty cycle is relatively low. Conversely when thermostat 103 frequently calls for heat over the measurement period the duty cycle is relatively high. With that in mind, RRM 111 may cause controller 105 to monitor the duty cycle of thermostat 103 and compare the duty cycle of thermostat 103 to a target duty cycle. The target duty cycle may be set to improve efficiency of the operation of heating system 100, to improve user comfort, or to achieve a desired balance between efficiency and user comfort.

For example, RRM 111 may be configured to achieve a target duty cycle of 90%, e.g., for the purpose of achieving a desired level of efficiency and user comfort. When controller 105 determines that the duty cycle of thermostat 103 is below or above the target duty cycle, it may issue a control signal to boiler 101, wherein the control signal is configured to adjust the boiler operating temperature downwards or upwards (respectively) until the duty cycle of thermostat 103 substantially matches the target duty cycle. In that way, room response technology can limit or prevent temperature swings within the various zones that are heated by the heating system, while also improving the operating efficiency of the boiler 101. Further details concerning room response technology can be found in U.S. Pat. No. 10,465, 920, the entire content of which is incorporated herein by reference.

While room response technology is effective, existing room response controllers produce a control signal that is incompatible with many types of boilers. Specifically, existing room response controllers are configured to produce a 0 to 10 volt direct current (0-10 Vdc) or 4 to 20 milliamp (mA) control signal to control the operating temperature of a boiler. Only a relatively small number (e.g., about 25%) of residential and commercial boilers include a control board (e.g., a low voltage board) that includes inputs that can receive a 0-10 Vdc or 4 to 20 mA control signal. Consequently, implementation of room response technology is limited to boilers that have the requisite inputs, or which can be retrofitted. Thus, there is a need in the art for improvements that can enable room response technology on a larger number of boilers. The present disclosure is aimed at that need.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

Figure 1:
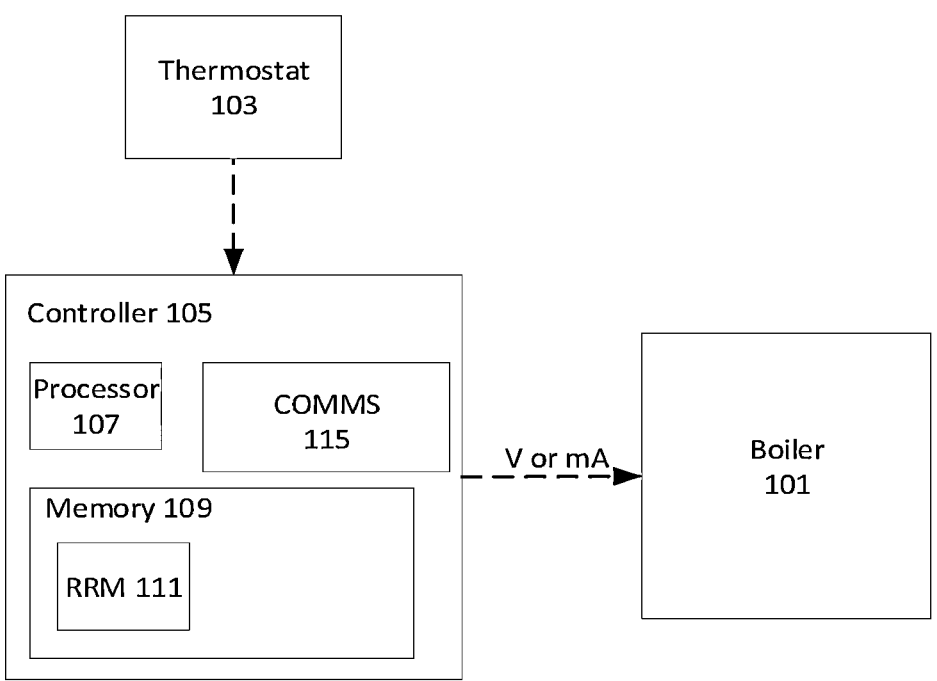
FIG. 1 is a block diagram of one example of a heating system including a room response controller, consistent with the present disclosure.

As noted in the background, room response technology can improve the efficiency of a heating unit such as a boiler, heat pump, or the like, without sacrificing user comfort. However, existing room response controllers produce control signals (0-10 Vdc or 4 to 20 mA) that are incompatible with many commercial and residential heating units, particularly commercial and residential boilers. As a result, it may be impossible, pragmatically difficult, and/or expensive to implement room response technology with heating units that have a control board that lacks inputs for receiving the control signals produced by existing room response controllers.

With the foregoing in mind, the present disclosure relates to technologies that can enable the use of room response technology on large number of commercial and residential heating units, and in particular commercial and residential boilers. As will become apparent from the following description, the technologies described herein can enable room response control on any boiler that has outdoor reset capability-a feature that is required by U.S. Department of Energy regulations to be included in every residential boiler sold in the United States. In general, outdoor reset technology enables the operating temperature of a boiler to be changed in response to a signal from an outdoor temperature sensor. The outdoor temperature sensor is communicatively coupled to an outdoor temperature input on the control board (e.g., low voltage board) of the boiler. In operation, the outdoor temperature sensor senses the air temperature around a building in which the boiler is installed and sends a resistance signal indicative of that temperature to the boiler control board. Depending on the outdoor air temperature, the resistance signal is configured to reduce or increase the boiler operating temperature in accordance with a heating curve. For example, when the outdoor air temperature is high, the resistance signal may cause the boiler operating temperature to be lowered. Conversely when the outdoor air temperature is low, the resistance signal may cause the boiler operating temperature to be raised. In sum, outdoor reset allows the operating temperature of a boiler to be set based the outdoor temperature around the building, limiting, or eliminating wasteful generation of excess heat when the outdoor temperature is high, while enabling the production of large amounts of heat when the outdoor temperature is low.

Aspects of the present disclosure relate to control systems, methods, and systems that can implement room response technology with a heating unit that has outdoor reset capability. As used herein, the term "heating unit" refers to a wide variety of systems for generating heat that is used for warming a room, building, or other location. Non-limiting examples of heating units consistent with the present disclosure include boilers, heat pumps (e.g., water to water heat pumps, water to air heat pumps, air to air heat pumps, etc.), combinations thereof, and the like. For clarity and ease of understanding the present disclosure will focus on embodiments in which a boiler is used as a heating unit, but the technologies described herein are not limited thereto.

In embodiments the control systems described herein include a processor and a memory that includes heating unit control instructions stored therein. The control system may be integral with or separate from the heating unit or, more particularly, a low voltage (control) board of the heating unit). In any case the heating unit control instructions when executed by the processor cause the control system to: determine a heating unit target temperature for the heating unit based at least in part on a duty cycle of at least one thermostat; determine a simulated outdoor temperature corresponding to the heating unit target temperature; determine a resistance value corresponding to the simulated outdoor temperature; and cause the provision of a resistance signal to an outdoor temperature sensor input for the heating unit, wherein the resistance signal includes the resistance value. In embodiments, the resistance signal is configured to cause the heating unit to modulate to the heating unit target temperature.

The resistance signal may be generated in any suitable manner. In embodiments, the control systems described herein include a variable potentiometer. In such instances the heating unit control instructions when executed may cause the control system to generate the resistance signal with the variable potentiometer.

The resistance value may be any suitable resistance value. In embodiments, the resistance value is a resistance value of a negative temperature coefficient (NTC) or a positive temperature coefficient (PTC) thermistor that corresponds to the simulated outdoor temperature. For example, the resistance value may be a resistance value of a 5K NTC, 10K type 2 NTC, 10K type 3 NTC, 12K NTC, 20K NTC, or 1025 Ohm PTC thermistor.

The resistance value may be determined by the control system in any suitable manner. In embodiments, the control system further includes a look up table (LUT), which may be stored in the computer readable memory or in another suitable location. Regardless of its location the LUT may include a plurality of outdoor temperatures and a plurality of resistance values, wherein each of the plurality of outdoor temperatures is correlated with a respective one of the plurality of resistance values. In such instances the heating unit control instructions when executed by the processor are configured to cause the control system to determine the resistance value corresponding to the simulated outdoor temperature at least in part with the look up table.

The simulated outdoor temperature may be determined in any suitable manner. In embodiments, the heating unit control instructions when executed are configured to cause the control system to determine the simulated outdoor temperature using the following expression:

$$O_{AT} = O_S - \left\{ (B_T - O_S) \left[ \frac{(O_S - O_D)}{(D_S - S_S)} \right] \right\} \qquad \text{Formula (I)}$$

In which $O_{AT}$ is the simulated outdoor temperature; $O_S$ is the outdoor start temperature of the heating unit; $B_T$ is the heating unit target temperature for the heating unit; $O_D$ is the outdoor design temperature of the heating unit; $D_S$ is the design supply temperature of the heating unit; and $S_S$ is the supply start temperature of a liquid supply to the heating unit.

In other embodiments the control systems described herein include a first controller and a second controller. The first controller is configured to communicatively couple to a thermostat, and the second controller is configured to communicatively couple to the first controller and an outdoor temperature input of a heating unit. In such embodiments the first controller may be configured to determine a heating unit target temperature for the heating unit based at least in part on a duty cycle of the thermostat, and to output a first signal indicative of the heating unit target temperature to the second controller. The second controller is configured to: determine the heating unit target temperature at least in part based on the first signal. In addition, the second controller is configured to: determine a simulated outdoor temperature corresponding to the heating unit target temperature; determine a resistance value corresponding to the simulated outdoor temperature; and cause the provision of a resistance signal including the resistance value to the outdoor temperature input of the heating unit.

Except for determining the heating unit target temperature based at least in part on the first signal, the operations of the second controller may be the same or generally the same as the operations of the control system described above. With that in mind, in embodiments the second controller is configured to determine the heating unit target temperature based at least in part on the first signal and a first lookup table, wherein the first lookup table is stored in a computer readable memory of the second controller or another suitable location. Regardless of its location, the first lookup table may correlate each of a plurality of values of the first signal to a corresponding one of a plurality of heating unit target temperatures. For example, when the first signal is direct current voltage (e.g., a 0-10 Vdc) or a current (e.g. 4 to 20 mA) signal, the second controller may determine the heating unit target temperature using a first lookup table that correlates a value of the direct current voltage or current signal to a corresponding one of a plurality of heating unit target temperatures. In such instances, the second controller may be further configured to determine the resistance value at least in part with a second lookup table that correlates each of a plurality of simulated outdoor air temperatures to a corresponding one or a plurality of resistance values. In embodiments the first and second lookup tables are integral with one another (i.e., are in the same table). In other embodiments, the first and second lookup tables are separate from one another.

Further aspects of the present disclosure relate to a heating system. The heating system includes a boiler with outdoor reset capability and an outdoor temperature input. The heating system further includes a thermostat, and a control system communicatively coupled to the outdoor temperature input and the thermostat. The control system is configured to: determine a heating unit target temperature for the boiler based at least in part on a duty cycle of the thermostat determine a simulated outdoor temperature corresponding to the heating unit target temperature; determine a resistance value corresponding to the simulated outdoor temperature; and cause the provision of a resistance signal to the outdoor temperature input, the outdoor temperature signal including the resistance value. The specific configuration and operations of the controller in such embodiments are the same or generally the same as discussed above and so are not reiterated.

Another aspect of the present disclosure relates to methods of controlling a heating unit (e.g., a boiler) with outdoor reset capability. In embodiments the methods include, with a control system: determining a heating unit target temperature for the boiler based at least in part on a duty cycle of a thermostat communicatively coupled to the control system; determining a simulated outdoor temperature corresponding to the heating unit target temperature; determining a resistance value corresponding to the simulated outdoor temperature; and causing the provision of a resistance signal to an outdoor temperature input of the heating unit, the resistance signal including the resistance value. As specific operations and hardware used in the methods may be the same or generally the same as described above in connection with control systems consistent with the present disclosure, such features are not reiterated.

Aspects of the present disclosure relate to control systems for heating units with outdoor reset capability and heating systems including the same. For brevity control systems consistent with the present disclosure are described in the context of example heating systems, but the control systems (and controllers) consistent with the present disclosure may be provisioned separately. With that in mind reference is made to FIG. 2, which is one example of a heating system that includes a control system consistent with the present disclosure. As shown, heating system 200 includes a heating unit 201, an outdoor temperature input 202 for heating unit 201, a thermostat 204, and a controller 205.

heating unit 201 may be any suitable type of heating unit that has outdoor reset capability, such as but not limited to a modulating boiler, a heat pump, combinations thereof, and the like. As used herein a heating unit has outdoor reset capability if its operating temperature is capable of being adjusted responsive to a resistance signal from an outdoor temperature sensor, as generally understood in the art. Non-limiting examples of suitable boilers that may be used as heating unit 201 include the outdoor reset capable boilers sold by Viessman (e.g., the Vitdodens—100W BIHA, BIKA, 200, B2HA, B2HB, 222 B2TA and B2TB, Vitocrossal 300 CU3A, etc.), Laars (e.g., the Laars Mascot, Neotherm, etc.), Lochinvar, Allied (e.g., the Allied SG, AAA, HSE, and Electric boilers), IBC (e.g., the IBC SL, VFC, DC, and HC series, etc.), NTI (e.g., the NTI Trinity and Vmax), Raypak, RBI, Smith Boiler, ATH, Navien, Camus, Buderus (e.g., the Buderus GB series), Peerless (e.g., the Peerless Purefire), Triangle Tube (e.g., the prestige solo and ACVMax), HTP (e.g., the HTP elite), Bosch (e.g. the Bosch Greenstar), Weil-Mclane (e.g. Weil-Mclane Ultra Series 3, Evergreen, and 97+), slant fin Lynx, Jaguar, and CHS, or a combination thereof.

Heating unit 201 may include or be communicatively coupled to outdoor temperature input 202. For the sake of illustration outdoor temperature input 202 is illustrated as being separate from heating unit 201, but such a configuration is not required. For example, outdoor temperature input 202 may be integral with heating unit 201 or, more particularly, be integral with a low voltage (e.g., main control) board of heating unit 201. In any case, outdoor temperature input 202 is configured to receive a resistance signal that is indicative of an outdoor temperature or a simulated outdoor temperature, as discussed below. In response to the resistance signal, heating unit 201 may adjust its operating temperature to a heating unit target temperature in accordance with the heating unit's outdoor reset ratio or "heating curve" as understood in the art.

Figure 2:
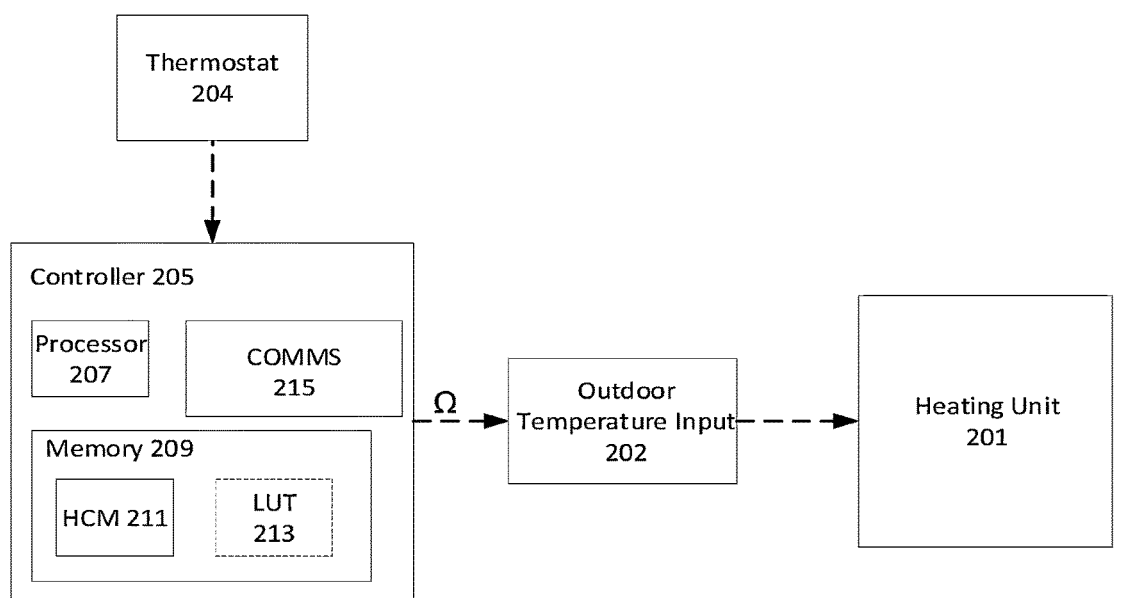
FIG. 2 is a block diagram of an example of a heating system including a control system consistent with the present disclosure.

Controller 205 includes processor 207, memory 209, heating unit control module 211, and communications circuitry (COMMS) 215. Any or all such components may be communicatively coupled to one another via a suitable interface, such as a bus (not shown). It is noted for the sake of clarity that FIG. 2 depicts controller 205 with limited components, and with various components that may be found in modern electronic devices (e.g., transmitters, antennas, displays, user interfaces, etc.) omitted. One of ordinary skill that the omitted components may be included in controller 205 on an as needed or as desired basis.

Processor 207 may be any suitable general purpose processor or application specific integrated circuit, and may be capable of executing one or multiple threads on one or multiple processor cores. Without limitation in some embodiments processor 207 is a general purpose processor, such as but not limited to the general purpose processors commercially available from INTEL® Corp., ADVANCED MICRO DEVICES®, ARM®, NVIDIA®, APPLE®, and SAMSUNG®. In other embodiments, processor 207 may be in the form of a very long instruction word (VLIW) and/or a single instruction multiple data (SIMD) processor. Moreover, while FIG. 2 illustrates controller 205 as including a single processor 207, multiple processors may be used.

Memory 209 may be any suitable type of computer readable memory. Example memory types that may be used as memory 209 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 209 may include other and/or later-developed types of computer-readable memory. Without limitation, in some embodiments memory 209 is configured to store data such as computer readable instructions in a non-volatile manner.

COMMS 215 may include hardware (i.e., circuitry), software, or a combination of hardware and software that is configured to allow controller 205 to receive and/or transmit data or other communications. For example, COMMS 215 may be configured to enable controller to transmit a resistance signal, e.g., to outdoor temperature input 202 of heating unit 201. Such communication may be via one or more pre-determined communications protocols. COMMS 215 may therefore be configured to support wired and/or wireless communication, and, thus, may include one or more transponders, antennas, BLUETOOTH™ chips, personal area network chips, near field communication chips, wired and/or wireless network interface circuitry, combinations thereof, and the like, so as to controller to communicate with other devices using one or more past, present, or future developed communications protocols (e.g., Wi-Fi, 3G, 4G, Bluetooth, near field communication, combinations thereof, and the like).

Without limitation, in embodiments COMMS 215 is configured to communicatively couple to thermostat 204, e.g., to enable controller 205 to monitor a duty cycle of thermostat 204. For example, COMMS 215 may be configured to receive (via wired or wireless communication) a thermostat signal from thermostat 204, e.g., when thermostat 204 calls for heat. In such instances, controller 205 may be configured to convey the thermostat signal to heating unit 201, e.g., via wired or wireless communication as understood in the art. In those or other embodiments, COMMS 215 may be configured to generate a resistance signal including a resistance value that is indicative of a simulated outdoor temperature, and to convey that resistance signal (via wired or wireless communication) to outdoor temperature input 202. In that regard, COMMS 215 may include any suitable circuitry or other components that enable it to generate a resistance signal that is compatible with outdoor temperature input 202. In embodiments, COMMS 215 includes or is coupled to a variable potentiometer (not shown), wherein the variable potentiometer is configured to generate a resistance signal including the resistance value as discussed in further detail below. Non-limiting examples of suitable variable potentiometers that could be used for this purpose are the AD5270 and AD5271 variable potentiometers sold by Analog Devices, Inc.

As will be described in detail below, controller 205 is generally configured to determine a heating unit target temperature for heating unit 201 based at least in part on a duty cycle of thermostat 204. For example, controller 205 may be configured to monitor a duty cycle of thermostat 204, e.g., in accordance with a room response algorithm as known in the art. In general, the room response algorithm may cause controller 205 to compare a duty cycle of thermostat 204 (also referred to as a measured duty cycle) to a target duty cycle. When the measured duty cycle is greater than or less than the target duty cycle, controller 205 may determine a heating unit target temperature for heating unit 201 that is greater than or less than a current heating unit temperature of heating unit 201. For example, when the measured duty cycle is greater than the target duty cycle, controller 205 may determine that a current heating unit temperature is too low, and thus may determine that a higher heating unit target temperature is needed. Conversely when the measured duty cycle is lower than the target duty cycle, controller 205 may determine that the current heating unit temperature is too high, and thus may determine that a lower heating unit target temperature is needed.

Once the heating unit target temperature is determined, controller 205 may determine a simulated outdoor temperature that correlates to the heating unit target temperature. Controller 205 may then determine a resistance value correlating to the simulated outdoor temperature, e.g., using a lookup table that correlates each a plurality of resistance values to corresponding one of a plurality of outdoor temperatures, e.g., in accordance with heating unit 201's outdoor reset capability. Controller 205 may then cause a resistance signal including the resistance value that correlates to the simulated outdoor temperature to outdoor temperature input 202, wherein the resistance signal is configured to cause heating unit 201 to adjust its operating temperature to the heating unit target temperature.

In that regard, controller 205 includes heating unit control module (HCM) 211. In embodiments HCM 211 is in the form of hardware or logic implemented at least in part in hardware to cause controller 205 to perform heating unit control operations consistent with the present disclosure. Alternatively or additionally, HCM 211 may include or be in the form of computer readable instructions which when executed by a processor (e.g., processor 207) cause controller 205 to perform heating unit control operations consistent with the present disclosure. In the latter case, at least a portion of HCM 211 may be stored in a memory of controller 205, such as memory 209 as shown in FIG. 2.

As further shown in FIG. 2, heating system 200 may optionally further include a look up table (LUT) 213. When used, optional LUT 213 may be stored in memory 209 or another suitable location. In any case, optional LUT 213 may include a plurality of outdoor temperatures and a plurality of resistance values, wherein each of the plurality of outdoor temperatures is correlated with a respective one of the plurality of resistance values. In such instances, controller 205 (or, more specifically, HCM 211) is configured to cause controller 205 to determine a resistance value corresponding to a simulated outdoor temperature at least in part with LUT 213.

The plurality of outdoor temperatures and plurality of resistance values in LUT 213 may be in accordance with values of an outdoor temperature sensor that is compatible with the outdoor reset functionality of heating unit 201. For example, heating unit 201 may be configured to implement outdoor reset with a resistance temperature detector (RTD) sensor, or a positive temperature coefficient (PTC) or negative temperature coefficient (NTC) temperature sensor such as a PTC or NTC thermistor. In such instances, LUT may include resistance values and outdoor temperature values in accordance with an RTD, PTC or NTC sensor. For example, heating unit 201 may be configured to implement outdoor reset with a 5K NTC, 10K (type 1, type 2, type 3) NTC, 12K NTC<20K NTC, or 1025 Ohm PTC thermistor. In such instances, LUT 213 may include a plurality of resistance values that are each correlated with a respective one of a plurality of outdoor temperature values, wherein the resistance values and outdoor temperature values are in accordance with one or more of the foregoing PTC or NTC sensor types.

For the sake of clarity and case of understanding, controller 205 is illustrated as a separate component from heating unit 201 and outdoor temperature input 202. Such a configuration is not required, however, and heating system 200 may be configured differently. For example, controller 205 may be integral with heating unit 201 or, more specifically, with a low voltage (main control) board thereof. Without limitation, controller 205 is preferably separate from heating unit 201 or, more specifically, from a main control board thereof.

Consistent with the foregoing description, HCM 211 is generally configured to cause controller 205 to perform heating unit control operations consistent with the present disclosure. Such heating unit control operations may include: determining a heating unit target temperature for heating unit 201 based at least in part on a duty cycle of thermostat 204; determining a simulated outdoor temperature for heating unit 201 corresponding to the heating unit target temperature; determining a resistance value corresponding to the simulated outdoor temperature; and causing the provision of a resistance signal to outdoor temperature input 202 for heating unit 201, wherein the resistance signal includes the resistance value.

Controller 205 may determine a heating unit target temperature for heating unit 201 in any suitable manner. In embodiments, HCM 211 is configured to cause controller 205 to determine a heating unit target temperature for heating unit 201 based at least in part on a duty cycle of thermostat 204. For example, HCM 211 may be configured to cause controller 205 to determine a heating unit target temperature for heating unit 201 in accordance with a room response algorithm, such as but not limited to the room response algorithm described in U.S. Pat. No. 10,465,920. Without limitation, in embodiments, HCM 211 may cause controller 205 to determine a heating unit target temperature for heating unit 201 at least in part by: determining a measured duty cycle of thermostat 204; comparing the measured duty cycle to a target duty cycle; and calculating or otherwise a heating unit target temperature for heating unit 201 when the measured duty cycle differs from the target duty cycle.

Regardless of how the heating unit target temperature for heating unit 201 is determined, HCM 211 may be configured to cause controller 205 to determine a simulated outdoor temperature corresponding to the heating unit target temperature. As used herein, the term "simulated outdoor temperature" refers to a temperature that is determined in some manner other than by measurement of a temperature of the environment around a structure in which heating unit 201 is installed. Without limitation, HCM 211 is configured to cause controller 205 to determine a simulated outdoor temperature corresponding to the heating unit operating temperature using the following expression:

$$O_{AT} = O_S - \left\{ (B_T - O_S) \left[ \frac{(O_S - O_D)}{(D_S - S_S)} \right] \right\} \qquad \text{Formula (I)}$$

Figure 6:
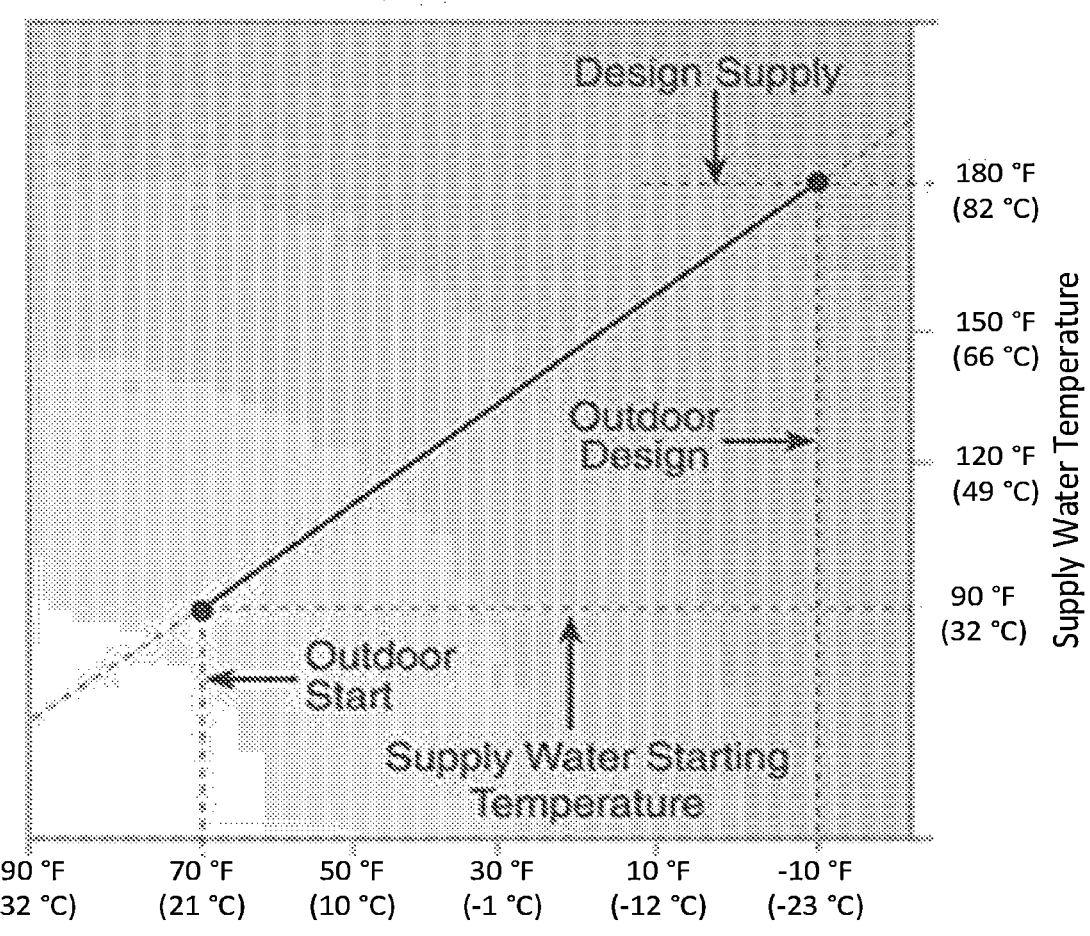
FIG. 6 is an example reset ratio graph plotting supply water temperature versus outdoor air temperature.

In which: $O_{AT}$ is the simulated outdoor temperature; $O_S$ is the outdoor start temperature of the heating unit; $B_T$ is the heating unit target temperature for the heating unit; $O_D$ is the outdoor design temperature of the heating unit; $D_S$ is the design supply temperature of the heating unit; and $S_S$ is the supply start temperature of a liquid supply to the heating unit. As will be understood by those of ordinary skill $O_S$, $O_D$, $D_S$ and $S_S$ are design parameters of a heating unit with outdoor reset capability. Thus, the values of $O_S$, $O_D$, $D_S$ and $S_S$ will vary based on the type and configuration of heating unit 201 and its install location, as would be understood by a person of skill. In embodiments, $B_T$ is in a range of about 70 to about 180° F., $O_S$ is in a range of about 60 to about 80° F., $O_D$ is in a range of about −40 to about 40° F. (e.g., about −10 to about 10° F.), $D_S$ is in a range of about 90 to about 200° F., (e.g. about 110 to about 190° F. or even about 170 to about 190° F.), and $S_S$ is in a range of about 60 to about 90° F. Such ranges are for the sake of example only, and the values of such parameters are generally set in accordance with heating unit 201's reset ratio and the climate in which the heating unit is to be used. For example, FIG. 6 is a graph of a reset ratio for one example of a boiler that can be used as heating unit 201, wherein $O_S$ is 70° F., $O_D$ is −10° F., $S_S$ is 90° F., and $D_S$ is 180° F. As shown, the boiler has a reset ratio that extends linearly between from the outdoor start, design start temperatures to the outdoor design, design supply temperatures.

As may be appreciated from the foregoing, the value of the simulated outdoor temperature that is determined by controller 205 depends on the heating unit target temperature. As such, it may be understood that the simulated outdoor temperature corresponds to the heating unit target temperature determined by controller 205, e.g., in accordance with a room response algorithm.

Once the simulated outdoor temperature ($O_{AT}$) is determined, HCM 211 may cause controller 205 to determine a resistance value corresponding to the simulated outdoor temperature. How this is performed is not limited, and controller 205 may determine a resistance value in any suitable manner. In embodiments and as briefly discussed above, controller 205 may be configured (or HCM 211 may be configured to cause controller 205) to determine a resistance value corresponding to the simulated outdoor temperature using one or more lookup tables. In that regard, as noted above heating units with outdoor reset capability are generally configured to receive a resistance signal from an outdoor temperature sensor. In general, the resistance signal includes a resistance value that corresponds to an outdoor temperature that is sensed by the sensor.

A variety of outdoor temperature sensors are known, with different outdoor temperature sensors providing different resistance signals. For example, heating unit 201 may be configured to implement outdoor reset based on a resistance signal provided by a resistance temperature detector, a thermistor, or other sensor that provides a variable resistance based on temperature, such as a positive temperature coefficient (PTC) or negative temperature coefficient (NTC) thermistor. For a PTC thermistor, resistance of the sensor increases a temperature increases, and decreases as temperature decreases. Conversely for a NTC thermistor, resistance decreases with increasing temperature, and increases with decreasing temperature. In either case, an NTC or PTC thermistor may be designed to provide a calibrated resistance value at a calibration temperature, such as 77° F., with resistance of the sensor increasing or decreasing from the calibration resistance as the outdoor temperature varies from the calibration temperature. For example, heating unit 201 may be configured to implement outdoor reset based on a signal from an NTC or PTC thermistor, such as a 5K (5000 Ohm) NTC, 10K (10,000 Ohm) type 2 NTC, 10K (10,000 Ohm) type 3 NTC, 12K (12,000 Ohm) NTC, 20K (20,000 Ohm) NTC or 1025 Ohm PTC thermistor, where the resistance values of such thermistors are the calibrated resistance of the sensor at the calibration temperature. In such instances, the terms "type 1," "type 2," "type 3" etc. refer to the relationship between temperature and resistance of the sensor.

With the foregoing in mind, HCM 211 may be configured to cause controller 205 to determine a resistance value corresponding to the simulated outdoor temperature using a lookup table that heating unit 201 is designed to use to implement outdoor reset. For example where heating unit 201 is designed to use a 5K Type 2 sensor to implement outdoor reset, HCM 211 may cause controller 205 to use a lookup table that correlates each of a plurality of resistance values to respective one of a plurality of outdoor temperatures in accordance with a 5K type 2 sensor.

To illustrate this concept, reference is made to Tables 1 and 2 below, which are example lookup tables for a 10K type 2 (table 1) and 10 k type 3 (table 2) outdoor temperature sensor that may be used by controller 205 to determine a resistance value corresponding to the simulated outdoor temperature. As can be seen, the type 2 and type 3 sensors both have a calibration resistance of 10,000 Ohms at 77° F., but have different resistances at other temperatures.

TABLE 1

| 10K Type 2 NTC Thermistor | |
| --- | --- |
| Resistance (Ohms) | Outdoor Temperature (° F.) |
| 336095 | −40 |
| 242426 | −31 |
| 176801 | −22 |
| 130307 | −13 |
| 97007 | −4 |
| 72910 | 5 |
| 55303 | 14 |
| 42316 | 23 |
| 32651 | 32 |
| 25395 | 41 |
| 19903 | 50 |
| 15714 | 59 |
| 12493 | 68 |
| 10000 | 77 |
| 8056 | 86 |
| 6530 | 95 |
| 5325 | 104 |
| 4367 | 113 |
| 3601 | 122 |
| 2985 | 131 |
| 2487 | 140 |

TABLE 2

| 10K Type 3 NTC Thermistor | |
| --- | --- |
| Resistance (Ohms) | Outdoor Temperature (° F.) |
| 239686 | −40 |
| 179200 | −31 |
| 135185 | −22 |
| 102861 | −13 |
| 78913 | −4 |
| 61020 | 5 |
| 47543 | 14 |
| 37313 | 23 |
| 29490 | 32 |
| 23457 | 41 |
| 18780 | 50 |
| 15130 | 59 |
| 12263 | 68 |
| 10000 | 77 |
| 8194 | 86 |
| 6752 | 95 |
| 5592 | 104 |
| 4655 | 113 |
| 3893 | 122 |
| 3271 | 131 |
| 2760 | 140 |

To determine a resistance value corresponding to the simulated outdoor temperature, HCM 211 may cause controller 205 to identify an outdoor temperature in lookup table 213 that is closest to the simulated outdoor temperature, and then identify the resistance value that is associated with that outdoor temperature in lookup table 213. For example, if the simulated outdoor temperature is 51 degrees, HCM 211 may cause controller to identify 50 degrees as the closest outdoor temperature in LUT 213 using table 1 or table 2 above. HCM 211 may the cause controller to identify 19903 Ohms or 18780 Ohms as the resistance value corresponding to the simulated outdoor temperature, depending on whether a 10K type 2 or 10K type 3 sensor is used. Of course, these values are for the sake of example only and will differ based on the type of outdoor sensor with which heating unit 201 is designed to implement outdoor reset.

Once controller 205 has determined a resistance value corresponding to the simulated outdoor temperature, HCM 211 may cause controller 205 to cause the provision of a resistance signal that includes or is indicative of the resistance value to outdoor temperature input 202. For example, HCM 205 may cause COMMS 215 to generate (or cause generation of) the resistance signal, and to transmit (or cause transmission of) the resistance signal to outdoor temperature input 202. Without limitation, in embodiments COMMS 215 is configured to generate the resistance signal and transmit or cause the transmission of the resistance signal to outdoor temperature input 202. In such instances, COMMS 215 may include circuitry or other hardware that is configured to generate the resistance signal, e.g., responsive to instructions (e.g., a signal) from controller 205 (or, more particularly, HCM 211). For example, COMMS 215 may include a variable potentiometer (not shown) that is configured to generate a variable resistance in response to a control signal. In such instances, HCM 211 may cause controller 205 to generate the resistance signal at least in part with the variable potentiometer. In any case, the resistance signal may be configured to cause heating unit 201 to modulate to (i.e., adjust) its operating temperature to the heating unit target temperature, e.g., in accordance with heating unit 201's outdoor reset ratio.

As described above FIG. 2 illustrates an embodiment in which a single controller is used as a control system for performing heating unit control operations consistent with the present disclosure. Such a configuration is not required, and the control systems described herein may be configured differently. In that regard reference is made to FIG. 3, which is a block diagram of another example of a heating system consistent with the present disclosure. As shown, heating system 300 includes a heating unit 201 with outdoor reset capability, an outdoor temperature input 202, and a thermostat 204. The nature and operation of heating unit 201, outdoor temperature input 202, and thermostat 204 is the same as described above in connection with FIG. 2, and thus is not described again in the interest of brevity. Heating system 300 further includes a control system 350. Control system 350 includes a controller 105 (which may also be understood as a first controller) and a second controller 301.

Controller 105 is generally configured to perform room response operations consistent with the prior art, e.g., as described above in connection with FIG. 1 and U.S. Pat. No. 10,465,920. In that regard, controller 105 may include a processor 107, memory 109, and communications circuitry (COMMS) 115. As non-limiting examples of suitable types of processors, memory, and communications circuitry that may be used for processor 107, memory 109, and COMMS 115, mention is made of the processors, memories, and communication circuitries described above in connection with processor 207, memory 209, and COMMS 215.

As discussed above, memory 109 may include a room response module 111 (RRM). RRM 111 may be in the form of hardware, logic implemented at least in part in hardware, and/or computer readable instructions that are configured to cause controller 105 to perform room response operations. That is, RRM 111 is generally configured to cause controller 105 to determine a heating unit target temperature for heating unit 201 based at least in part on a duty cycle of thermostat 204. For example, RRM 111 may determine a heating unit target temperature for heating unit 201 based at least in part on a duty cycle of thermostat 204 in accordance with a room response algorithm, as described previously. In that regard, controller 105 may be communicatively coupled (or configured to communicatively couple) with thermostat 204 via a wired or wireless communication protocol. RRM 111 may cause controller 105 to monitor a duty cycle of thermostat 204 to determine a measured duty cycle, and to compare the measured duty cycle to a target duty cycle. RRM 111 may further cause controller 105 to determine a heating unit target temperature based on the comparison of the measured duty cycle to the target duty cycle. For example, if the measured duty cycle is less than the target duty cycle, RRM 111 may cause controller 105 to calculate a heating unit target temperature for heating unit 201 that is lower than a current operating temperature of heating unit 201. Conversely when the measured duty cycle is greater than the target duty cycle, RRM 111 may cause controller 105 to calculate a heating unit target temperature that is higher than a current operating temperature of heating unit 201. Similarly, when the measured duty cycle is equal or substantially equal to the target duty cycle, RRM 111 may cause controller 105 to calculate a heating unit target temperature that is equal ore substantially equal to a current heating unit operating temperature of heating unit 201.

Regardless of how the heating unit target temperature is determined, RRM 111 may cause controller 105 to transmit (output) or cause the transmission of a first signal indicative of the heating unit target temperature to second controller 301. In embodiments the first signal is in the form of a DC voltage (Vdc) or current signal, such as a 0-10 VdC or 4 to 20 mA signal produced by existing room response controllers. With that in mind, in embodiments controller 105 is a room response controller, such as but not limited to the 302P, 303P, 303V, 304P, 304V, 305V, 306P, and 306V zone controls and switching relays by TEKMAR®.

Figure 3:
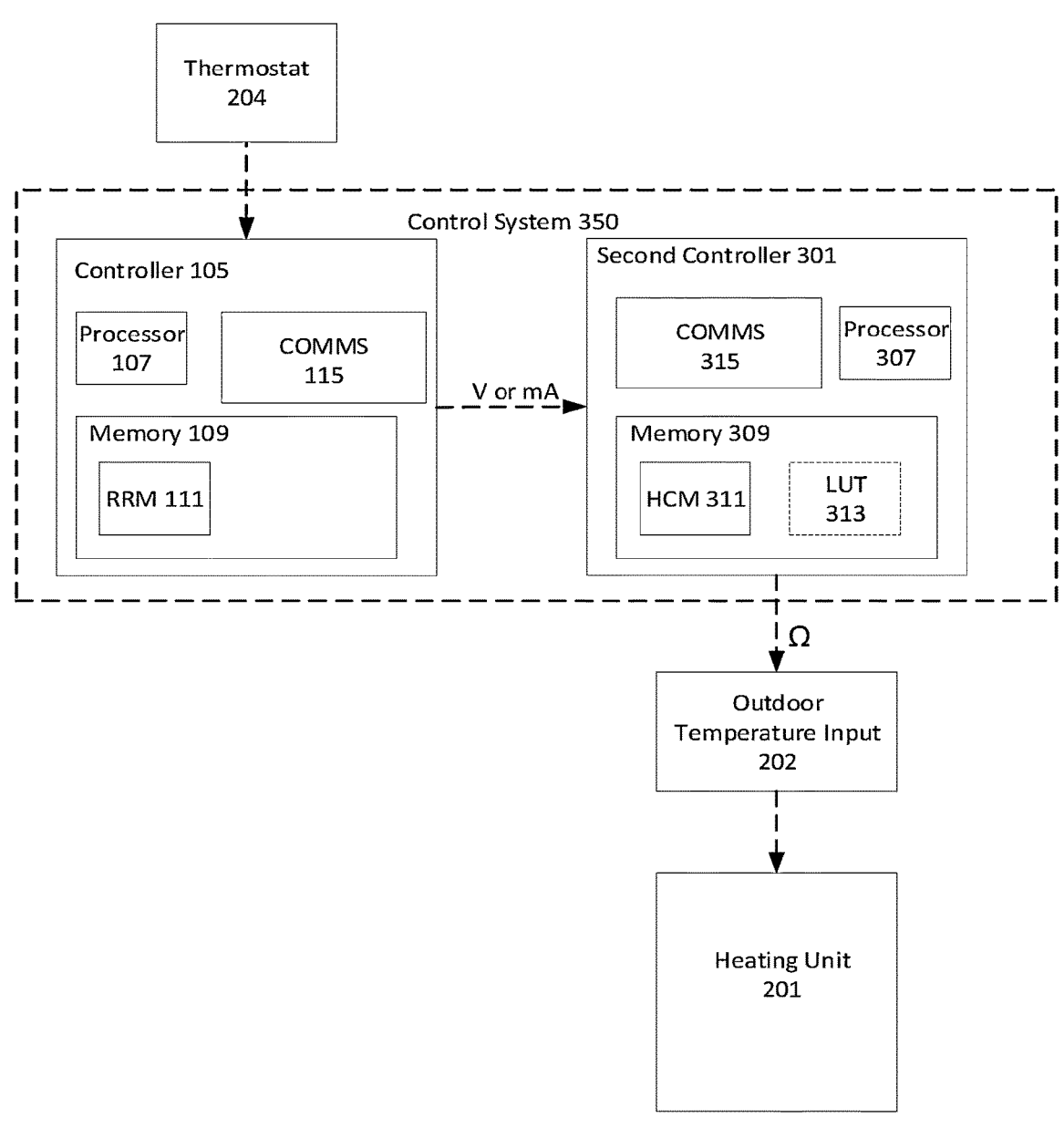
FIG. 3 is a block diagram of another example of a heating system including a control system consistent with the present disclosure.

As shown in FIG. 3, second controller 301 includes a processor 307, memory 309, heating unit control module 311, optional look up table(s) 313, and communications circuitry 315. As non-limiting examples of suitable types of processors, memory, and communications circuitry that may be used for processor 307, memory 309, and COMMS 315, mention is made of the processors, memories, and communication circuitries described above in connection with processor 207, memory 209, and COMMS 215.

With the foregoing in mind, HCM 311 may be in the form of hardware, logic implemented at least in part in hardware, and/or computer readable instructions that are configured to cause second controller 301 to perform heating unit control operations consistent with the present disclosure. The heating unit control operations may include determining the heating unit target temperature for heating unit 201 based at least in part on the first signal received from controller 105. In addition, the heating unit control operations may include determining a simulated outdoor temperature corresponding to the heating unit target temperature; determining a resistance value corresponding to the simulated outdoor temperature; and provisioning or causing the provisioning of a resistance signal including or indicative of the resistance value to outdoor temperature input 202, wherein the resistance signal is configured to cause heating unit 201 to adjust its operating temperature to the target temperature, e.g., in accordance with its outdoor reset ratio as described above.

Second controller 301 may determine the heating unit target temperature based at least in part on the first signal in any suitable manner. In that regard, second controller may be communicatively coupled (or configured to communicatively couple) to controller 105 and to outdoor temperature input 202 e.g., via a wired or wireless communications protocol. In embodiments, second controller 301 is communicatively coupled to controller 301, and is configured to receive (e.g., with COMMS 315) the first signal indicative of the heating unit target temperature for heating unit 201 from controller 105. In embodiments, in response to receipt of the first signal, HCM 311 may cause controller 301 to determine the heating unit target temperature at least in part with the first signal and a (first) lookup table that correlates each of a plurality of reference values of the first signal to a corresponding one of a plurality of heating unit target temperatures. For example, when the first signal is a Vdc signal such as a 0-10 V Vdc signal, the first lookup table may correlate each incremental reference value (e.g., 0 Vdc, 0.1 Vdc, 0.2 Vdc . . . 10 Vdc) of the first signal to a corresponding heating unit target temperature (e.g., in a range of about 70 to about 180° F.). Likewise, when the first signal is a current signal such as a 4-24 mA current signal, the first lookup table may correlate each incremental reference value of the current signal (e.g., 4 mA, 4.1 mA, 4.2 mA . . . 24 mA) to a corresponding heating unit target temperature (e.g., in a range of about 70 to about 180° F.). In such instances, HCM 311 may cause controller 301 to determine the heating unit target temperature by comparing a value of the first signal to first signal reference values in the first lookup table, identifying a closest first signal reference value in the first lookup table to the value of the first signal, and identifying a heating unit target temperature associated with the closest first signal reference value.

Once second controller 301 has determined the heating unit target temperature at least in part from the first signal, HCM 311 may cause second controller 301 to perform other heating unit control operations consistent with the present disclosure and in the same manner as described above in connection with the embodiment of FIG. 2. For example, HCM 311 may cause second controller 301 to determine a simulated outdoor temperature corresponding to the heating unit target temperature; determine a resistance value corresponding to the simulated outdoor temperature; and cause the provision of a resistance signal including or indicative of the resistance value to outdoor temperature input 202. Notably, once second controller 301 has determined the simulated outdoor temperature, HCM 311 may cause second controller 301 to determine a resistance value using a (second) lookup table that correlates each of a plurality of resistance values to a corresponding one of a plurality of outdoor temperatures. The second lookup table may be the same or different from the first lookup table employed to determine the heating unit target temperature from the first signal. Otherwise, the above noted operations of second controller 301 are the same as those described above for corresponding operations in association with FIG. 2. Accordingly, they are not described again in the interest of brevity.

The above description of FIGS. 2 and 3 focus on embodiments in which a controller (e.g., controller 205, second controller 301) determines a resistance value corresponding to a simulated outdoor temperature using a lookup table that is locally stored, e.g., in a memory of the controller. Such a configuration is not required and controllers 205, 301 (and systems 200, 300) may be configured differently. For example, controllers 205, 301 may have networking functionality that enables them to communicate with a separate computing system (e.g., a server) via wired or wireless communication. The separate computing system may be connected to systems 200, 300 (i.e., installed in or near the same location) via a local area network (LAN) or a wide area network (WAN, e.g., the internet). In any case, in such instances COMMS 215, 315 may be configured to enable controllers 205, 301 to communicate with the separate computing system in any suitable manner. With that in mind, HCM 211, 311 may be configured to cause controllers 205, 301, respectively, to determine a resistance value corresponding to the simulated outdoor temperature at least in part with the separate computing system. For example, after a simulated outdoor temperature has been determined, controllers 205, 301 may transmit a (second) signal including or indicative of the simulated outdoor temperature to the separate computing system. In response to the second signal, the separate computing system may determine a resistance value corresponding to the simulated outdoor temperature, wherein the resistance value is selected based at least in part on a type of outdoor temperature sensor with which heating unit 201 is designed to implement outdoor reset. The separate computing system may then transmit a (third) signal including or indicative of the resistance value to controllers 205, 301 for forwarding to outdoor temperature input 202, or it may transmit the third signal to outdoor temperature input 202.

Figure 4:
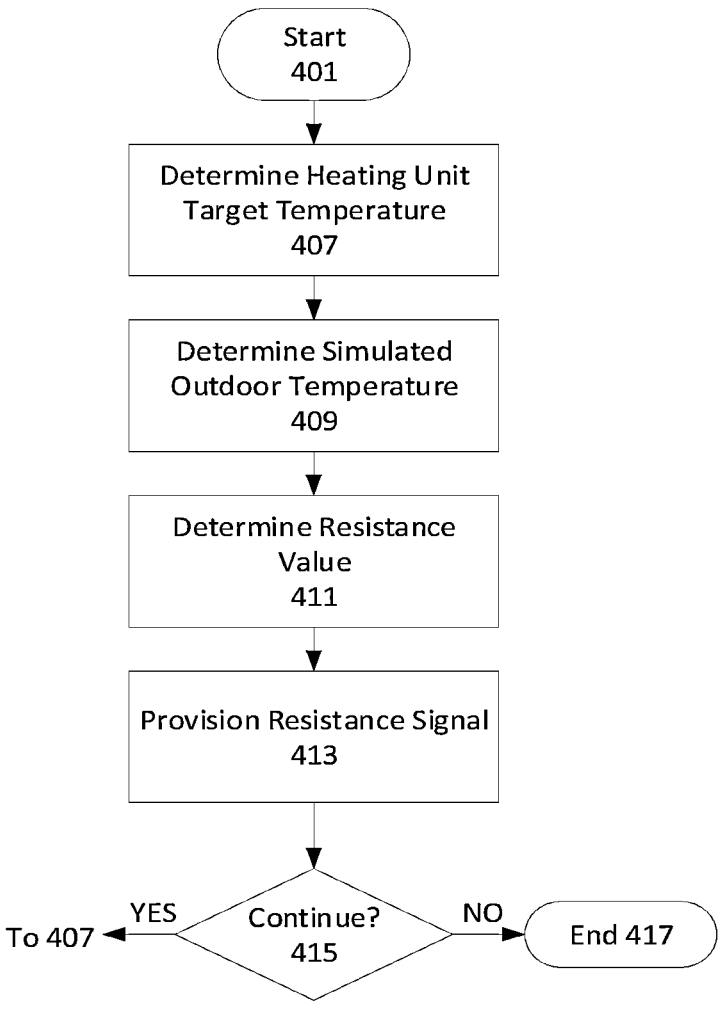
FIG. 4 is a flow diagram of example operations of one example of a boiler control method consistent with the present disclosure.

Another aspect of the present disclosure relates to methods of controlling a heating unit with outdoor reset capability. In that regard reference is made to FIG. 4, which is a flow diagram of example operations of one example of a method of controlling a heating unit consistent with the present disclosure. As shown, method 400 begins a block 401. The method may then proceed to block 407, pursuant to which a heating unit target temperature (HTT) for a heating unit may be determined, e.g., with a controller. For example, and as described above, operations of block 407 may include determining, with a controller (e.g., controller 105 or 205), a measured duty cycle of a thermostat of a heating unit; comparing the measured duty cycle to a target duty cycle; and determining a heating unit target temperature for a heating unit at least in part based on the comparison of the measured duty cycle to the target duty cycle. More generally, operations of block 407 may include determining, with a controller, a heating unit target temperature in accordance with a room response algorithm. Alternatively, a heating unit target temperature for the heating unit may be determined in any other suitable manner.

The method may then proceed from block 407 to block 409, pursuant to which a simulated outdoor temperature corresponding to the heating unit target temperature may be determined. The operations of block 407 may include, for example, determining a simulated outdoor temperature corresponding to the heating unit target temperature with a controller (e.g., controller 205, 301) as discussed above. In embodiments, the simulated outdoor temperature corresponding to the heating unit target temperature is determined by a controller (205, 301) using formula (I) noted above. Alternatively, the simulated outdoor temperature may be determined in another manner, such as with a lookup table or other data structure correlating each of a plurality of heating unit target temperatures with a corresponding one of a plurality of simulated outdoor temperatures.

The method may then proceed to block 411, pursuant to which a resistance value corresponding to the simulated outdoor temperature is determined. Consistent with the above discussion, the operations of block 411 may include determining, with a controller (e.g., controller 205, 301) a resistance value corresponding to a simulated outdoor temperature, e.g., at least in part with a lookup table that correlates each of a plurality of simulated outdoor temperatures to a corresponding one of a plurality of resistance values. As previously discussed, the resistance value may be selected based on a type of outdoor sensor with which the heating unit is designed to implement outdoor reset.

The method may then proceed to block 413, pursuant to which a resistance signal including or indicative of the resistance value may be provisioned to an outdoor temperature input of the heating unit. Operations pursuant to block 413 may include, with a controller, causing the generation of a resistance signal, and causing the transmission of the resistance signal to the outdoor temperature input. For example, the controller may include or be communicatively coupled to a variable potentiometer or other hardware that can provide a resistance signal. In such instances the controller may cause the generation of the resistance signal at least in part with the variable potentiometer or other hardware. In any case, the resistance signal is configured to cause the heating unit to adjust its operating temperature to the heating unit target temperature, e.g., in accordance with the heating unit's outdoor reset ratio.

The method may then proceed to block 415, pursuant to which a determination may be made as to whether the method is to continue. If so, the method loops back to block 407. But if not, the method proceeds to block 417 and ends.

Figure 5:
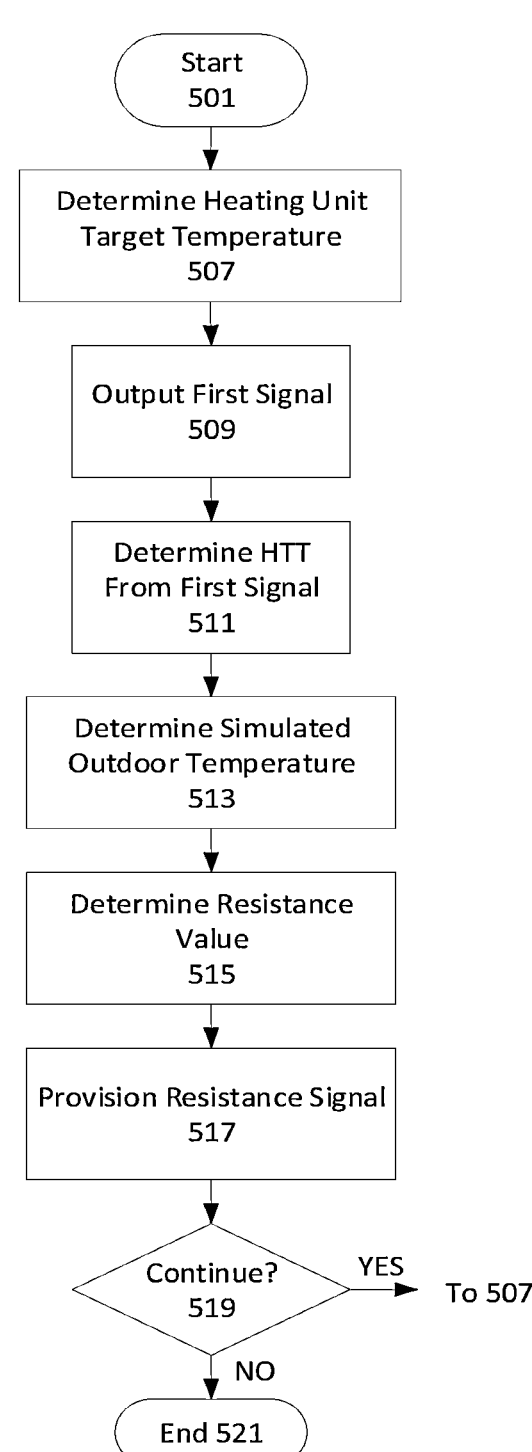
FIG. 5 is a flow diagram of example operations of another example of a boiler control method consistent with the present disclosure.

FIG. 5 is a flow diagram of example operations of another method of controlling a heating unit with outdoor reset capability consistent with the present disclosure. As shown, method 500 begins with block 501. The method may then proceed to block 507, pursuant to which a heating unit target temperature (HTT) for a heating unit may be determined. Operations of block 507 may include, with a first controller, determining a heating unit target temperature based at least in part on a duty cycle of a thermostat for said heating unit, as described above in connection with FIG. 3. For example, a first controller may determine a measured duty cycle of the thermostat and compare the measured duty cycle to a target duty cycle. Based at least in part on that comparison, the first controller may determine a heating unit target temperature for the heating unit. More generally, the first controller may determine the heating unit target temperature for the heating unit in accordance with a room response algorithm. Alternatively, the first controller may determine a heating unit target temperature for the heating unit in another suitable manner.

Following the operations of block 507 the method may proceed to block 509, pursuant to which a first signal may be output. More specifically, operations pursuant to block 509 may include outputting, with a first controller, a first signal to a second controller that is communicatively coupled to the first controller and to an outdoor temperature input of the heating unit. In embodiments the first signal is a vDC (e.g., 0-10 vDC) or a current (e.g., a 4-24 mA) signal.

Following block 509 the method may proceed to block 511, pursuant to which the heating unit target temperature is determined based at least in part on the first signal. More specifically, operations pursuant to block 511 may include receiving the first signal with a second controller and determining the heating unit target temperature based at least in part on the first signal with the second controller. For example, the second controller may determine the heating unit target temperature with a (first) lookup table that correlates each of a plurality of values of the first signal to each of a plurality of heating unit target temperatures as discussed above.

The method may then proceed to block 513, pursuant to which a simulated outdoor temperature corresponding to the heating unit target temperature may be determined. More specifically, operations pursuant to block 513 may include, with the second controller, determining a simulated outdoor temperature corresponding to the heating unit target temperature. In embodiments the second controller may determine the simulated outdoor temperature with formula (I) as discussed above. Alternatively, the second controller may determine the simulated outdoor temperature in another suitable manner.

The method may then proceed to block 515, pursuant to which a resistance value corresponding to the simulated outdoor temperature may be determined. More specifically, operations of block 515 may include determining, with the second controller, a resistance value corresponding to the simulated outdoor temperature, e.g., with a (second) lookup table that correlates each of a plurality of resistance values with a corresponding one of a plurality of outdoor temperatures as discussed above. Alternatively, the second controller may determine the resistance value corresponding to the simulated outdoor temperature in another suitable manner.

The method may then proceed to block 517, pursuant to which a resistance signal including or indicative of the resistance value may be provisioned an outdoor temperature input of the heating unit. Operations pursuant to block 517 may include, with the second controller, causing the generation of a resistance signal, and causing the transmission of the resistance signal to the outdoor temperature input. For example, the second controller may include or be communicatively coupled to a variable potentiometer or other hardware that can provide a resistance signal. In such instances the second controller may cause the generation of the resistance signal at least in part with the variable potentiometer or other hardware. In any case, the resistance signal is configured to cause the heating unit to adjust its operating temperature to the heating unit target temperature, e.g., in accordance with the heating unit's outdoor reset ratio.

The method may then proceed to block 519, pursuant to which a determination may be made as to whether the method is to continue. If so, the method loops back to block 507. But if not, the method proceeds to block 521 and ends.

To illustrate the operation of a control system consistent with the present disclosure an example heating system consistent with the present disclosure will not be described. The heating system in this example is configured in the manner shown in FIG. 2, and assumes that heating unit 201 is a boiler configured to implement outdoor reset using an outdoor sensor that is a 10 k type 2 thermistor with the resistance response noted above in Table 1. The boiler is configured to implement outdoor reset using a heating curve that has an outdoor start ($O_S$) of 70° F., a supply start ($S_S$) of 70° F., an outdoor design ($O_D$) of 10° F., and design supply ($D_S$) of 180° F.

With that in mind, in this example controller 205 monitors the duty cycle of thermostat 204 and compares the measured duty cycle to a target duty cycle, e.g., in accordance with a room response algorithm. Based on the comparison, controller 205 determines that an adjustment to the operating temperature of heating unit 201 is needed. Specifically, controller 205 determines that the operating temperature of heating unit 201 should be adjusted to a boiler operating temperature of 150° F. Using Formula (I) and 150° F. as the heating unit target temperature ($B_T$), the controller 205 calculates a simulated outdoor temperature ($O_{AT}$) corresponding to the heating unit target temperature ($B_T$) of 26.37° F.

Controller 205 then determines a resistance value corresponding to the simulated outdoor temperature using a lookup table 213 that includes resistance values correlated to one of a plurality of outdoor temperature, i.e., table 1 above. Specifically, controller 205 determines an outdoor temperature in lookup table 213 that is closest to the simulated outdoor temperature. In this case, the outdoor temperature in table 1 (lookup table 213) to the simulated outdoor temperature of 26.37° F. is 23° F. Controller 205 then determines a resistance value corresponding to the closest outdoor temperature, in this case 42,316 Ohms.

Controller 205 then causes the provision of a resistance signal including or indicative of the resistance value to outdoor temperature input 202. In this example, controller 205 includes or is communicatively coupled to a variable potentiometer and causes the variable potentiometer to produce a resistance signal with a resistance value of 42,316 Ohms. Controller 205 transmits or causes the transmission of the resistance signal (e.g., with COMMS 215) to outdoor temperature input 202. The resistance signal causes the heating unit 201 to adjust its operating temperature to the heating unit target temperature, e.g., using the reset ratio/heating curve employed by heating unit 201 in accordance with its outdoor reset functionality.

As may be appreciated from the foregoing, the technologies of the present disclosure enable control over the operating temperature of a wide range of heating units (e.g., boilers) by providing a resistance signal that includes or is indicative of a resistance value that corresponds to a simulated outdoor temperature and, ultimately, to a heating unit target temperature. One notable advantage of the technologies described herein is that they can enable use of room response technology on any boiler or other heating unit that has outdoor reset functionality. Thus, the technologies herein can provide pathways to improving the operational efficiency of many heating units, without or without substantially impacting user comfort.

As used herein, the term "about" when used in connection with a value or a range, means+/−5% of the indicated value of the indicated endpoints of the range.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A control system for a boiler heating unit with outdoor reset capability, comprising:

a processor; and a computer readable memory comprising boiler control instructions, wherein said boiler control instructions when executed by the processor cause the control system to:

determine a boiler target temperature for the boiler based at least in part on a duty cycle of at least one thermostat;

determine a simulated outdoor temperature corresponding to the boiler target temperature, wherein the simulated outdoor temperature is not based on a measured outdoor temperature;

determine a resistance value corresponding to the simulated outdoor temperature; and cause provision of a resistance signal to be sent to an outdoor temperature input for the boiler, the resistance signal including or indicative of the resistance value, wherein the resistance signal is configured to cause the boiler to change the boiler target temperature from a first value to a second value.

2. The control system of claim 1, further comprising a variable potentiometer, wherein said boiler control instructions when executed by the processor cause the control system to cause the provision of said resistance signal with said variable potentiometer.

3. The control system of claim 1, wherein said resistance value is a resistance value of a negative temperature coefficient (NTC) thermistor, a positive temperature coefficient (PTC) thermistor, or a resistance temperature detector (RTD) that corresponds to the simulated outdoor temperature.

4. The control system of claim 1, wherein:

said computer readable memory further comprises a look up table comprising a plurality of outdoor temperatures and a plurality of resistance values, wherein each of the plurality of outdoor temperatures is correlated with a respective one of the plurality of resistance values; and the boiler control instructions are configured to cause the control system to determine the resistance value corresponding to the simulated outdoor temperature at least in part with the look up table.

5. The control system of claim 1, wherein said boiler control instructions when executed by said processor cause the control system to determine the simulated outdoor temperature using the following expression:

$$OAT=OS-BT-OSOS-ODDS-SS$$

wherein:

$O_{AT}$ is the simulated outdoor temperature;

$O_S$ is an outdoor start temperature of the boiler;

$B_T$ is the boiler heating unit target temperature for the boiler;

$O_D$ is an outdoor design temperature of the boiler;

$D_S$ is a design supply temperature of the boiler; and $S_S$ is a supply start temperature of a liquid supply to the boiler.

6. A control system for a boiler with outdoor reset capability, comprising:

a processor; and a computer readable memory comprising boiler control instructions, wherein said boiler control instructions when executed by the processor cause the control system to:

receive a thermostat signal from at least one thermostat, the thermostat signal representative of a target room temperature;

determine a boiler target temperature for the boiler heating unit based at least in part on a duty cycle of the at least one thermostat;

determine a simulated outdoor temperature corresponding to the boiler target temperature;

determine a resistance value corresponding to the simulated outdoor temperature; and cause provision of a resistance signal to be sent to an outdoor temperature input for the boiler, the resistance signal including or indicative of the resistance value, wherein the resistance signal does not modify the target room temperature, and wherein the resistance signal is configured to cause the boiler to change the boiler target temperature from a first value to a second value.

7. The control system of claim 6, further comprising a variable potentiometer, wherein said boiler control instructions when executed by the processor cause the control system to cause the provision of said resistance signal with said variable potentiometer.

8. The control system of claim 6, wherein said resistance value is a resistance value of a negative temperature coefficient (NTC) thermistor, a positive temperature coefficient (PTC) thermistor, or a resistance temperature detector (RTD) that corresponds to the simulated outdoor temperature.

9. The control system of claim 6, wherein:

said computer readable memory further comprises a look up table comprising a plurality of outdoor temperatures and a plurality of resistance values, wherein each of the plurality of outdoor temperatures is correlated with a respective one of the plurality of resistance values; and the boiler control instructions are configured to cause the control system to determine the resistance value corresponding to the simulated outdoor temperature at least in part with the look up table.

10. The control system of claim 6, wherein said boiler control instructions when executed by said processor cause the control system to determine the simulated outdoor temperature using the following expression:

OAT=OS-BT-OSOS-ODDS-SS wherein:

$O_{AT}$ is the simulated outdoor temperature;

$O_S$ is an outdoor start temperature of the boiler;

$B_T$ is the boiler heating unit target temperature for the boiler;

$O_D$ is an outdoor design temperature of the boiler;

$D_S$ is a design supply temperature of the boiler; and $S_S$ is a supply start temperature of a liquid supply to the boiler.

11. The control system of claim 6, wherein the simulated outdoor temperature is not based on a measured outdoor temperature.

12. A control system for a boiler with outdoor reset capability, comprising:

one or more controllers configured to:

determine a boiler target temperature for the boiler based at least in part on a duty cycle of a thermostat communicatively coupled to the control system;

correlate a simulated outdoor temperature to the boiler target temperature, wherein the simulated outdoor temperature is not based on a measured outdoor temperature; and cause a resistance signal to be sent to an outdoor temperature input of the boiler to cause the boiler to adjust an actual boiler temperature to the boiler target temperature, the resistance signal based, at least in part, on the simulated outdoor temperature.

13. The control system of claim 12, wherein the one more controllers is further configured to receive a thermostat signal from the thermostat, the thermostat signal representative of a target room temperature, wherein the resistance signal does not modify the target room temperature.

14. The control system of claim 12, wherein the one or more controllers includes a first controller configured to be communicatively coupled to a thermostat and a second controller configured to be communicatively coupled to the first controller.

15. The control system of claim 14, wherein the first controller is configured to determine the boiler target temperature for the boiler based at least in part on a duty cycle of the thermostat, and to output a first signal indicative of the boiler target temperature to the second controller.

16. The control system of claim 15, wherein the second controller is configured to correlate the simulated outdoor temperature to the boiler target temperature based at least in part on the first signal and cause the resistance signal to be sent to the outdoor temperature input of the boiler.

17. The control system of claim 12, wherein said one or more controllers is further configured to correlate the simulated outdoor temperature to the boiler target temperature using the following expression:

OAT=OS-BT-OSOS-ODDS-SS wherein:

$O_{AT}$ is the simulated outdoor temperature;

$O_S$ is an outdoor start temperature of the boiler;

$B_T$ is the boiler heating unit target temperature for the boiler;

$O_D$ is an outdoor design temperature of the boiler;

$D_S$ is a design supply temperature of the boiler; and $S_S$ is a supply start temperature of a liquid supply to the boiler.

18. The control system of claim 12, wherein the one or more controllers is further configured to determine the resistance value at least in part with a second lookup table that correlates each of a plurality of simulated outdoor temperatures to a corresponding one of a plurality of resistance values.

* * * * *